US009174603B2

(12) United States Patent
Fischer et al.

(10) Patent No.: US 9,174,603 B2

(45) Date of Patent: Nov. 3, 2015

(54) AIR BAG WITH TEAR STITCHED TETHER

(71) Applicant: TRW Vehicle Safety Systems Inc., Washington, MI (US)

(72) Inventors: Kurt F. Fischer, Leonard, MI (US); Patrick Landis, Washington, MI (US)

(73) Assignee: TRW VEHICLE SAFETY SYSTEMS INC., Washington, MI (US)

(*) Notice: Subject to any disclaimer, the term of this patent is extended or adjusted under 35 U.S.C. 154(b) by 0 days.

(21) Appl. No.: 14/228,382

(22) Filed: Mar. 28, 2014

(65) Prior Publication Data

US 2015/0274115 A1 Oct. 1, 2015

(51) Int. Cl.
*B60R 21/239* (2006.01)
*B60R 21/00* (2006.01)

(52) U.S. Cl.
CPC ....... *B60R 21/239* (2013.01); *B60R 2021/0004* (2013.01); *B60R 2021/2395* (2013.01)

(58) Field of Classification Search
CPC ................. B60R 21/2338; B60R 2021/23382; B60R 2021/23384
See application file for complete search history.

(56) References Cited

U.S. PATENT DOCUMENTS

| | | | | |
|---|---|---|---|---|
| 3,879,056 | A | 4/1975 | Kawashima et al. | |
| 5,308,113 | A | 5/1994 | Moriset | |
| 5,489,119 | A | 2/1996 | Prescaro et al. | |
| 5,613,708 | A | 3/1997 | Bleider et al. | |
| 5,678,858 | A | 10/1997 | Nakayama et al. | |
| 5,813,696 | A | 9/1998 | Hill | |
| 5,997,037 | A | 12/1999 | Hill et al. | |
| 7,475,906 | B2 * | 1/2009 | Goto et al. | 280/743.2 |
| 7,954,850 | B2 | 6/2011 | Fischer et al. | |
| 8,262,130 | B2 * | 9/2012 | Fischer et al. | 280/743.2 |
| 8,419,058 | B2 * | 4/2013 | Fischer et al. | 280/743.2 |
| 8,434,786 | B2 * | 5/2013 | Jang et al. | 280/743.2 |
| 8,544,883 | B2 * | 10/2013 | Fischer et al. | 280/743.2 |
| 8,696,022 | B2 * | 4/2014 | Fischer et al. | 280/739 |
| 8,727,378 | B2 * | 5/2014 | Hiruta et al. | 280/743.2 |
| 8,764,058 | B2 * | 7/2014 | Fischer et al. | 280/743.2 |
| 2001/0035639 | A1 | 11/2001 | Amamori | |
| 2002/0175511 | A1 | 11/2002 | Dunkle et al. | |
| 2008/0042416 | A1 * | 2/2008 | Razazi et al. | 280/743.2 |
| 2009/0033081 | A1 * | 2/2009 | Flischer et al. | 280/743.2 |

(Continued)

*Primary Examiner* — Drew Brown
(74) *Attorney, Agent, or Firm* — Tarolli, Sundheim, Covell & Tummino LLP

(57) ABSTRACT

An apparatus for helping to protect an occupant of a vehicle includes an inflatable vehicle occupant protection device inflatable between a vehicle surface and the vehicle occupant. The protection device includes a front panel having a portion presented toward the occupant when the protection device is in an inflated condition. A vent includes at least one opening for releasing inflation fluid from the protection device and has an actuated condition and a non-actuated condition. A tether has a first segment connected to the vent and the front panel of the protection device for actuating the vent and a second segment connected to the front panel and a rear portion of the protection device. Tear stitching connects portions of the second segment of the tether to form a slackened portion of the tether. The tear stitching remains intact such that the first segment is slackened and the vent in the non-actuated condition in response to initial deployment of the protection device below a predetermined degree. Further deployment of the protection device to the predetermined degree causes the tear stitching to rupture and release the slackened portion, which allows the first segment of the tether to tension and act on the vent to place the vent in the actuated condition.

27 Claims, 9 Drawing Sheets

(56) References Cited

U.S. PATENT DOCUMENTS

2009/0230663 A1* 9/2009 Mills et al. .................... 280/735
2010/0090450 A1* 4/2010 Webber ......................... 280/736
2011/0031723 A1* 2/2011 Fischer et al. ............. 280/730.1
2011/0198828 A1* 8/2011 Fischer et al. ............. 280/743.2
2013/0026744 A1 1/2013 Fischer et al.

* cited by examiner

AIR BAG WITH TEAR STITCHED TETHER

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

SUMMARY OF THE INVENTION

The present invention relates to an apparatus for helping to protect an occupant of a vehicle. The apparatus includes an inflatable vehicle occupant protection device inflatable between a vehicle surface and the vehicle occupant. The protection device includes a front panel having a portion presented toward the occupant when the protection device is in an inflated condition. A vent includes at least one opening for releasing inflation fluid from the protection device and has an actuated condition and a non-actuated condition. A tether has a first segment connected to the vent and the front panel of the protection device for actuating the vent and a second segment connected to the front panel and a rear portion of the protection device. Tear stitching connects portions of the second segment of the tether to form a slackened portion of the tether. The tear stitching remains intact such that the first segment is slackened and the vent in the non-actuated condition in response to initial deployment of the protection device below a predetermined degree. Further deployment of the protection device to the predetermined degree causes the tear stitching to rupture and release the slackened portion, which allows the first segment of the tether to tension and act on the vent to place the vent in the actuated condition.

The present invention also relates to an apparatus for helping to protect an occupant of a vehicle. The apparatus includes an inflatable vehicle occupant protection device inflatable between a vehicle surface and the vehicle occupant. The protection device includes a front panel having a portion presented toward the occupant when the protection device is in an inflated condition. A vent includes at least one opening for releasing inflation fluid from the protection device and has an actuated condition and a non-actuated condition. A tether connected to the vent and the protection device is provided for actuating the vent. Tear stitching extends through the tether and forms a slackened portion of the tether. The tear stitching remains intact to prevent the tether from fully tensioning such that the vent is in the non-actuated condition in response to initial deployment of the protection device below a predetermined degree. Further deployment of the protection device to the predetermined degree causes the tear stitching to rupture and release the slackened portion which allows the tether to act on the vent and place the vent in the actuated condition.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

Figure 1:
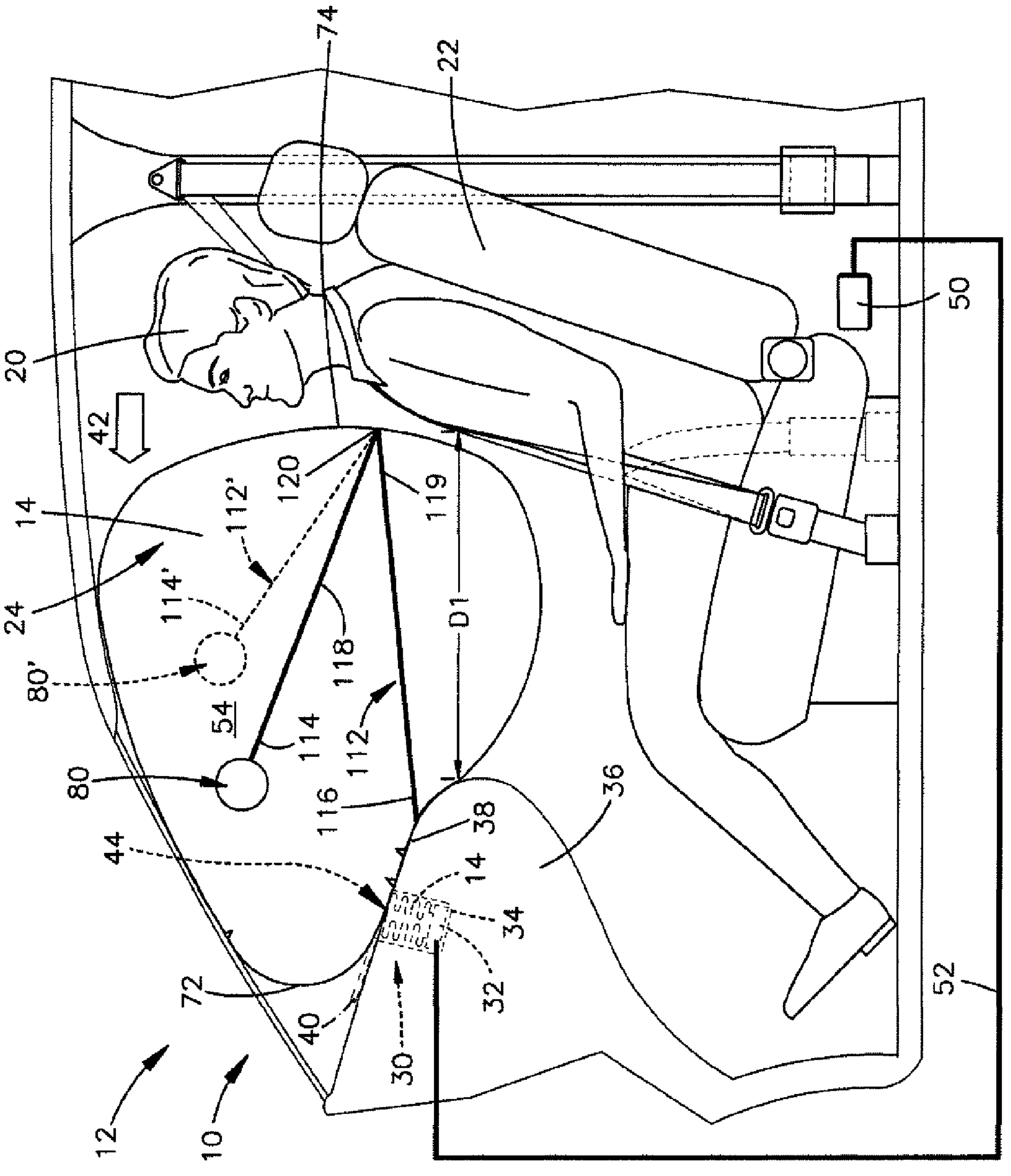
FIG. 1 is a schematic side view illustrating an apparatus for helping to protect an occupant of a vehicle in a first condition according to a first embodiment of the present invention.

The present invention relates to an apparatus for helping to protect an occupant of a vehicle. More particularly, the present invention relates to an air bag inflatable between an instrument panel and a front seat occupant of a vehicle. In an embodiment illustrated in FIGS. 1 and 2, an apparatus 10 for helping to protect an occupant 20 of a vehicle 12 includes an inflatable vehicle occupant protection device 14 in the form of an air bag. In one example, the air bag 14 is a passenger frontal air bag for helping to protect an occupant 20 of a seat 22 on a passenger side 24 of the vehicle 12.

The air bag 14, when deployed in response to an event for which occupant protection is desired, helps protect the occupant 20 by helping to absorb the force of impact placed on the air bag by the occupant. When the occupant 20 impacts the air bag 14, the occupant penetrates into the air bag, which absorbs and distributes the impact forces throughout the large area and volume of the bag. By “penetrates” into the air bag 14, it is meant to refer to the instance where, in the case of a frontal impact to the vehicle 12, the occupant 20 is moved forward, as indicated by the arrow labeled 42 in FIGS. 1 and 2, into engagement with the air bag 14.

The "penetration" of the occupant into the air bag 14 is the distance or degree to which the occupant 20 moves into the fully inflated depth of the air bag. The degree of penetration could be measured as the distance the penetrating occupant 20 moves a given point on a front panel 74 of the air bag 14 toward a dash or instrument panel 36 of the vehicle 12 from which the air bag deploys. For example, penetration could be measured as the distance between a point on the front panel 74 and a fixed point on the instrument panel 36 or between a point on the occupant 20, e.g. the occupant's chest, and a fixed point on the instrument panel.

The air bag 14 may be part of an air bag module 30 that includes an inflator 32 and a housing 34. The air bag 14 has a stored condition, indicated by dashed lines in FIG. 1, in which the air bag is folded and placed in the housing 34. The module 30 is mounted to the instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening 44 in the instrument panel 36 through which the air bag 14 may be deployed from the stored condition in the housing 34. The door 40 may be connected to the vehicle 12, e.g., connected to the instrument panel 36, either directly or through the housing 34, by means (not shown), such as a plastic hinge portion, a strap or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon, e.g., woven nylon 6-6 yarns, and may be constructed in any suitable manner. For example, the air bag 14 may include one or more pieces or panels of material. If more than one piece or panel is used to construct the air bag 14, the pieces or panels may be interconnected by known means, such as stitching, ultrasonic welding, heat bonding or adhesives, to form the air bag. The air bag 14 may be uncoated, coated with a material, such as a gas impermeable urethane or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

The air bag 14 may have one or more actuatable features for helping to control or tailor inflation of the air bag in response to vehicle conditions, occupant conditions or both. These features may be actuatable actively, for example, in response to conditions determined via active sensors or passively, for example, having a configuration responsive to physical conditions at the time of inflation. For example, the air bag 14 includes a vent 80 and a tether 112 for selectively actuating the vent. The vent 80 is selectively actuatable to release inflation fluid from the inflatable volume 54 of the air bag 14 in response to tension applied to the tether 112.

The vent 80 may be configured such that the actuated condition of the vent is either an open condition or a closed condition. In this description, an "actuated open" vent is closed at the time of deployment, and unrestricted air bag deployment tensions the tether and actuates the vent (substantially or fully) opened. Occupant penetration into the air bag 14 throttles the vent back towards the closed condition. Additionally, in this description, an "actuated closed" vent is open at the time of deployment, and unrestricted air bag 14 deployment tensions the tether 112 and actuates the vent 80 (substantially or fully) closed. Occupant penetration into the air bag 14 throttles the vent 80 back towards the open condition. Those skilled in the art will appreciate that the selection of an actuated open or actuated closed vent 80 configuration can be based on a variety of factors, such as the position of the air bag 14 (driver frontal/passenger frontal) and the desired cushioning and ride down characteristics.

The tether 112 is a flexible, elongated member extending from a first end 114 to a second end 116. The first end 114 is secured to a portion of the vent 80 for actuating the vent. The second end 116 is secured to a rear portion 38 of the air bag 14 adjacent the instrument panel 36. The tether 112 is secured between its ends 114, 116 at a connection 120 to the front panel 74 presented towards the occupant 20. The connection 120 bifurcates the tether 112 into a first segment 118 connected to the vent 80 and the front panel 74 and a second segment 119 connected to the rear portion 38 and the front panel. The first and second segments 118, 119 may have substantially identical lengths when unslackened. The first and second segments 118, 119 are secured to the respective components by known means, such as stitching or welding. In one example, the first and second segments 118, 119 of the tether 112 are integrally formed together and secured to the front panel 74 at a single connection 120. Alternatively, the first and second segments 118, 119 may be separate components secured to the front panel 74 at a single connection 120 or at spaced-apart connections (not shown).

Figure 2:
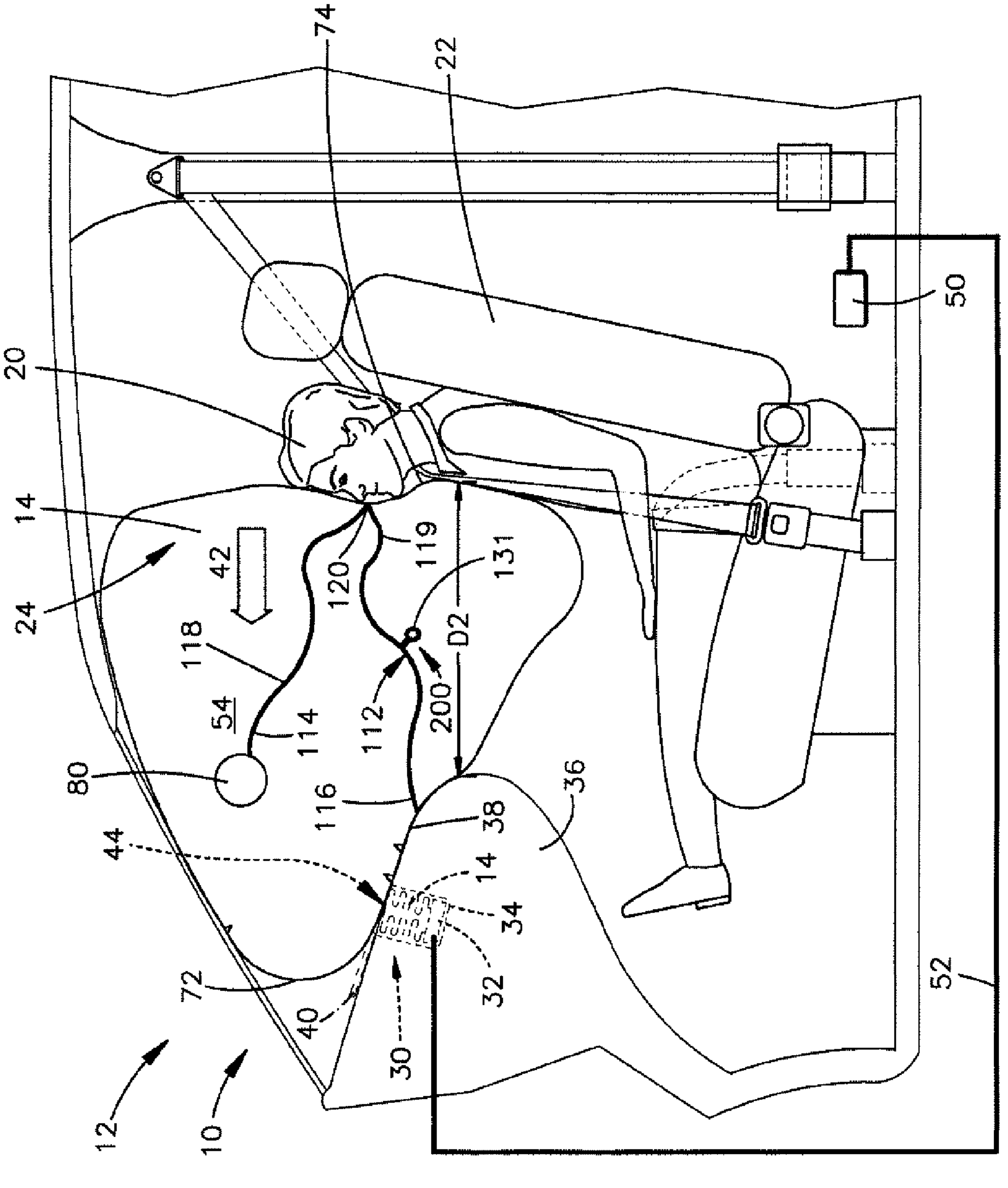
FIG. 2 is a schematic illustration of the apparatus of FIG. 1 in a second condition.

The second segment 119 is doubled over onto itself or interconnected at spaced-apart segments or portions by releasable tear stitching 200 to form a slackened portion 131 (see FIG. 2). The slackened portion 131 therefore shortens the second segment 119 and, thus, the tear stitched second segment is shorter than the unstitched first segment 118. The tear stitching 200 is configured to rupture and release the slackened portion 131 when forces acting on the tear stitching, such as tension on the second segment 119, reach or exceed a predetermined magnitude that corresponds with a desired degree of air bag 14 inflation and deployment. The second segment 119 of the tether 112 therefore has a first, shortened condition (FIG. 2) when the slackened portion 131 is held by the tear stitching 200 and a second, lengthened condition (FIG. 1) when the tear stitching ruptures to release the slackened portion.

In the shortened condition (FIG. 2), the second segment 119 of the tether 112 prevents actuation of the vent 80 by the first segment 118 to prevent the air bag 14 from reaching the fully deployed, large volume condition of FIG. 1 and maintains the air bag in the reduced size and volume condition of FIG. 2. The second segment 119, in the shortened condition, is therefore effective to reduce or limit the effective size and volume of the air bag 14. In the lengthened or fully taught condition of the second segment 119, the first segment 118 of the tether 112 actuates the vent 80 to allow the air bag 14 to reach the fully inflated and deployed condition of FIG. 1.

Figure 3B:
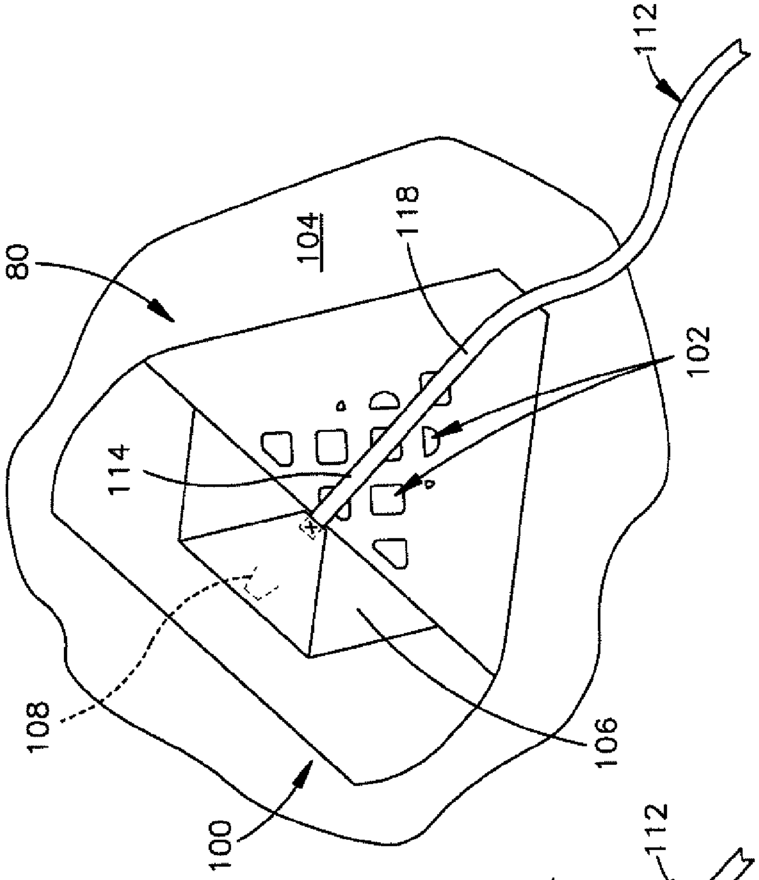
FIG. 3B is an enlarged portion of the apparatus of FIG. 2.
Figure 3A:
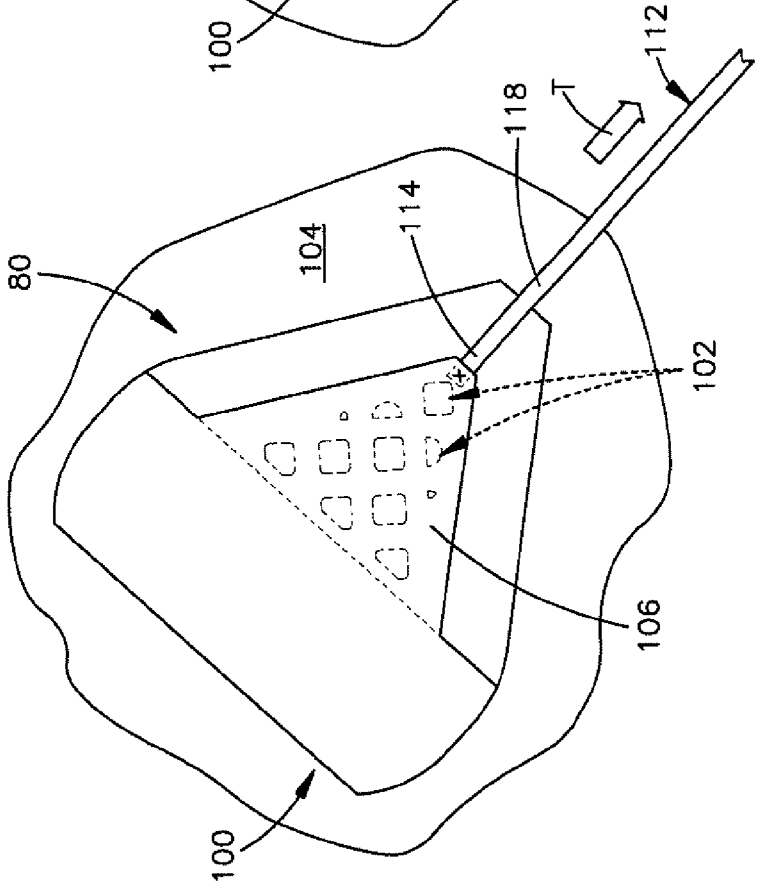
FIG. 3A is an enlarged portion of the apparatus of FIG. 1.

The vent 80 may have any actuated open or actuated closed configuration that is capable of cooperating with the tether 112 to provide venting of the air bag 14 in accordance with the description set forth above. Referring to FIGS. 3A and 3B, the vent 80 is an actuated closed vent 100 that is actuatable to prevent inflation fluid from exiting the air bag 14. The vent 100 includes one or more vent openings 102 formed in a side panel 104 of the air bag 14, a vent door 106 secured to the side panel, and the tether 112 secured to the vent door for selectively actuating the vent. The vent door 106 is secured to the side panel 104 by known means (not shown), such as stitching, ultrasonic welding, heat bonding or adhesives.

The vent 100 has a closed condition (FIG. 3A) in which the vent door 106 extends over and covers the vent openings 102 and thereby prevents inflation fluid from passing through the vent openings. The closed condition illustrated in FIG. 3A corresponds with the vehicle 12 and/or occupant 20 conditions illustrated in FIG. 1. The vent 100 has an open condition (FIG. 3B) in which the vent door 106 is positioned away from the vent openings 102 and thereby permits inflation fluid to vent, i.e., flow, through the vent openings. In the open condition, the vent door 106 is folded away from the vent openings 102 and held in place by a releasable tear stitch 108. The open condition illustrated in FIG. 3B corresponds with the vehicle 12 and/or occupant 20 conditions illustrated in FIG. 2. The tether 112 is secured to the vent door 106 and may apply tension T to the vent door to selectively actuate the vent 100 from the open condition to the closed condition.

Referring to FIGS. 1 and 2, upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated and deployed condition illustrated in FIG. 1. The air bag 14, while inflated, helps protect the vehicle occupant 20 from impacts with parts of the vehicle 12, such as the instrument panel 36.

When an event occurs in which inflation of the air bag 14 is desired, the vent 80 and tether 112 respond to vehicle conditions, occupant conditions or both to help control inflation and deployment of the air bag. For example, the vent 80 may adapt based on the position of the occupant 20 upon the occurrence of the event for which inflation of the air bag 14 is desired. Prior to such an event, the vent 80 is in the open, unactuated condition while stored in the air bag module 30. If, upon the occurrence of an event for which inflation of the air bag 14 is desired, the occupant 20 is in the normally seated position of FIG. 1, the vent 80 is actuated to the closed condition and the air bag 14 inflates to the normally deployed condition due to the cooperation of the tether 112 and vent.

In the normally seated condition, the occupant 20 is spaced from the air bag 14 and must move forward in order to engage and penetrate the air bag. This distance can be measured in terms of occupant chest to instrument panel (IP) distance, which is indicated at $D_1$ in FIG. 1. The distance that the occupant 20 must travel before this engagement takes place can vary depending on the occupant/seat position prior to air bag deployment. In this configuration, the air bag 14 may also be constructed such that the tether 112 does not actuate the vent 80 in response to the obstructed deployment of the air bag 14 when, for example, the occupant 20 is away from the normally seated position at a forward seated position in which the seat 22 is moved closer to the instrument panel 36. The forward seated position may correspond with the position of the seat 22 needed to accommodate a smaller occupant 20. The degree of forward movement of the seat 22 in FIG. 2 can be calculated as the difference between the inflated depth $D_1$ in FIG. 1 and a reduced depth, labeled $D_2$ in FIG. 2.

As the air bag 14 inflates and pressurizes the front panel 74 moves away from the instrument panel 36, thereby moving the connection 120 secured thereto away from the instrument panel and lengthening the tether 112. The tear stitched second segment 119 is shorter than the unstitched first segment 118 and, thus, the second segment tensions prior to the first segment as the unrestricted air bag 14 expands and deploys. Consequently, the second segment 119 becomes taught and tension is applied to the tear stitching 200 securing the slackened portion 131 prior to the first segment becoming taught. Since the first end 114 of the tether 112 is not tensioned the vent 80 remains in the unactuated condition at this stage of deployment. When the air bag 14 reaches a threshold or predetermined pressure, tension on the second segment 119 is sufficient to rupture the tear stitching 200, thereby releasing the slackened portion 131 and allowing the second segment 119 to fully tension and lengthen. This permits the front panel 74 to move further outward with the expanding air bag 14 toward the fully inflated and deployed condition of FIG. 1.

When the slackened portion 131 is released, the outwardly moving connection 120 tensions both segments 118, 119 of the tether 112. In particular, once the tear stitching 200 tears or ruptures, the moving connection 120 removes the slack in both the first segment 118 and the now released slackened portion 131. Tensioning of the entire tether 112 occurs until the front panel 74 reaches a predetermined distance away from the instrument panel 36, at which point the entire tether becomes tensioned. Further inflation of the air bag 14 thereafter causes the first segment 118 of the tether 112 to pull on the vent door 106 and ultimately actuate the vent 80. More specifically, the tensioning force T applied to the vent door 106 by the now taught first segment 118 breaks or otherwise ruptures the tear stitching 108 and moves the door portion to the closed condition of FIG. 3A. The vent door 106 blocks inflation fluid flow through the vent openings 102, allowing the air bag 14 to inflate to the normally deployed and pressurized condition of FIG. 1.

Referring to FIG. 2, if, upon the occurrence of the event, the occupant 20 is positioned away from the normally seated position, the occupant may impede or restrict the air bag 14 from reaching the fully inflated position. This may occur when the seat 22 for the occupant 20 is moved forward from the position shown in FIG. 1 so as to impede inflation of the air bag 14. In this case, the second segment 119 of the tether 112 is not sufficiently tensioned to rupture the tear stitching 200. Accordingly, the first segment 118 of the tether 112 is not sufficiently tensioned and, thus, the vent 80 remains in the open, unactuated condition. As a result, pressurization of the air bag 14 through the open vent 80 is limited and, thus, the air bag inflates and deploys to the small volume condition of FIG. 2.

More specifically, when the occupant 20 is in the forward seated position the front panel 74 is only capable of moving the distance $D_2$ away from the instrument panel 36. The distance $D_2$ corresponds with an air bag 14 inflation depth or pressure below the predetermined amount necessary to adequately tension the second segment 119 and rupture the tear stitching 200. The intact tear stitching 200 therefore retains the slackened portion 131 and, thus, the first segment 118 of the tether 112 does not and cannot fully tension. Consequently, the first segment 118 of the tether 112 applies no tension to the vent 80 and, thus, the vent remains unactuated when the occupant 20 is positioned in the forward seated position.

One having ordinary skill in the art will readily understand that the tear stitching 200 and tether 112 of the present invention help ensure that the vent 80 is reliably actuated when the occupant 20 is in the normally seated position. Likewise, the tear stitching 200 and tether 112 help ensure the vent 80 reliably remains unactuated when the occupant 20 is positioned away from the normally seated position. More specifically, the first segment 118 of the tether 112 does not and cannot fully tension unless the tear stitching 200 ruptures to release the slackened portion 131. The first segment 118 therefore cannot actuate the vent 80 unless the tear stitching 200 on the second segment 119 ruptures. Since the tear stitching 200 only ruptures when the air bag 14 inflates over a predetermined amount it is clear that the vent 80 does not actuate until the air bag 14 is sufficiently inflated. Consequently, venting of the air bag 14 is reliably controlled by the tether 112 and tear stitching 200 of the present invention.

The tear stitching 200 and tether 112 of the present invention are also advantageous for helping to ensure the vent 80 does not prematurely actuate during inflation and deployment of the air bag 14. Referring to FIG. 1, in a typical air bag construction the vent (shown in phantom at 80') is actuated by a single segment tether (shown in phantom at 112') secured to and between the vent 80' and the air bag 14. During inflation and deployment, the initial slack in the single segment tether 112' allows the vent 80' to move or shift positions about the air bag 14. Due to this movement, the vent 80' may move to an undesirable position on the air bag 14 during deployment that prematurely tensions the tether 112'. Consequently, the tether 112' may apply tension to the vent 80' prior to the air bag 14 becoming pressurized to the degree to which actuation of the vent is desired.

The slackened portion 131 and tear stitching 200 of the present invention help ensure the vent 80 reaches its desired position on the air bag 14 during deployment prior to being actuated. The first end 114 of the tether 112 does not and cannot apply tension to the vent door 106 sufficient to actuate the vent 80 until or unless the front panel 74 reaches the predetermined distance from the instrument panel 36. As noted, however, the front panel 74 may only reach the predetermined distance from the instrument panel 36 if the tear stitching 200 ruptures to release the slackened portion 131. Consequently, the vent 80 of the present invention cannot be actuated until or unless the tear stitching 200 releases the slackened portion 131, thereby allowing the vent to reach the desired position on the air bag 14 before being actuated.

The air bag 14 is configured such that the time difference between the onset of air bag inflation and the release of the slackened portion 131 is sufficient to allow the vent 80 to reaches its proper, predetermined position on the air bag. Subsequent actuation of the vent 80 will therefore occur only while the vent is properly oriented in the air bag 14, thereby ensuring the vent not only actuates at the proper time but also while in the proper position.

According to the present invention, a rupturable tear stitch configuration that promotes predictability, repeatability, and reliability in releasing interconnected fabrics is used to form the tear stitchings 108 and 200. The tear stitchings 108 and 200 illustrated in FIGS. 1-3B are two examples of potential implementations of the tear stitch configuration of the present invention. Those skilled in the art will appreciate that the tear stitch configuration of the present invention may be implemented to provide a releasable connection between any desired fabric components of a vehicle occupant protection device.

Figure 4A:
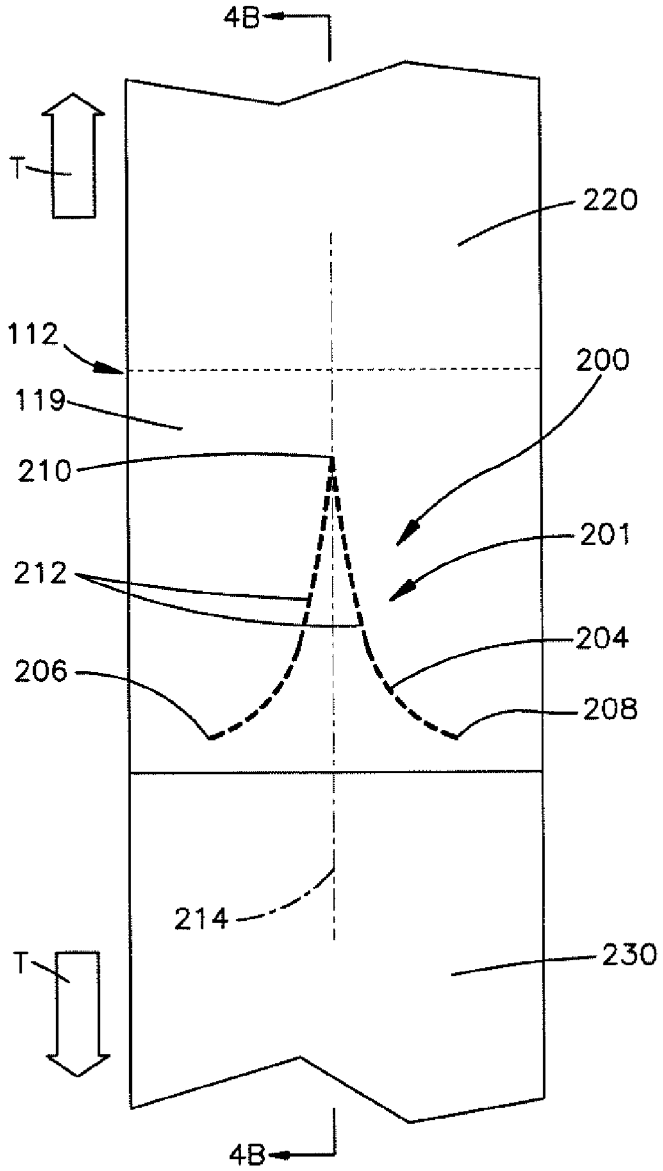
FIG. 4A is an enlarged schematic view illustrating tear stitching for the apparatus of FIG. 1 in accordance with an aspect of the present invention.
Figure 4B:
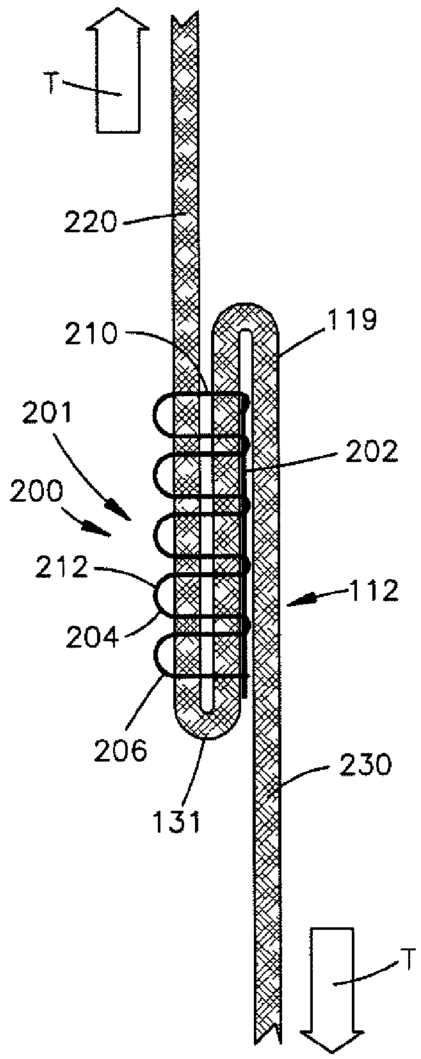
FIG. 4B is a sectional view taken generally along line 4B-4B in FIG. 4A.

FIGS. 4A and 4B illustrate an example tear stitching 201 in accordance with the present invention. The tear stitching 201 may constitute the tearing stitching 200 and/or the tear stitching 108 of FIGS. 1-3B. In FIGS. 4A and 4B, the tear stitching 201 constitutes the tear stitching 200 for selectively releasing the slackened portion 131 of the tether 112. The tear stitching 201 interconnects first and second portions of material 220 and 230 positioned in an adjacent and overlying manner. As representative of the tear stitching 200 in FIGS. 1-3B, the first and second portions of material 220 and 230 may correspond to the overlying portions of the second segment 119 of the tether 112 that form the slackened portion 131. In this instance, the first and second portions of material 220, 230 constitute any spaced-apart portions of the second segment 119 and may be overlayed with one another in any manner any number of times. As another example, representative of the tear stitching 108 in FIGS. 1-3B, the first portion of material 220 may correspond to the vent door 106 and the second portion of material 230 may correspond to the side panel 104 of the air bag 14 (not shown).

The tear stitching 201 may be constructed using conventional sewing techniques and equipment. The tear stitching 201 includes a bobbin thread 202 and a stitch thread 204. The stitch thread 204 extends through the first and second portions 220 and 230 and loops around the bobbin thread. As best shown in FIG. 4A, the tear stitching 201 is a line of stitching having a start point 206 and an end point 208. A break point 210 is located between, e.g., at the midpoint between, the start point 206 and the end point 208. The break point 210 is the point along the tear stitching 201 where it is intended that the tear stitching rupture under tension.

The tear stitching 201 has an inverted, generally curved V-shaped configuration with outwardly diverging curved segments or legs 212 that meet at the break point 210. The tear stitching 201 is arranged such that an axis of symmetry 214 of the tear stitching extends generally parallel to the two opposed directions in which tension, indicated generally by the arrows labeled T in FIGS. 4A and 4B, is applied to the first and second portions 220 and 230. The axis of symmetry 214 bisects the V-shaped configuration of the tear stitching 201.

The tear stitching 201 is configured to rupture in response to the tension T applied to the first and second portions of material 220 and 230. This tension T may correspond, for example, to the tension applied to the overlying portions of the second segment 119 of the tether 112 or to the tension applied to the vent door 106 and side panel 104 during deployment of the air bag 14. The first and second portions of material 220 and 230 are arranged such that the tension T applied to the portions results in a peeling action or motion between the portions, which acts on the tear stitching 201. In the embodiment illustrated in FIGS. 4A and 4B, this peeling action is produced by folding back the second portion 230 such that it overlies the tear stitching 201. When the tension T is applied, the resulting peeling action helps focus the tension on the break point 210 of the tear stitching 201.

According to the present invention, the predictability, reliability, and repeatability with which the tear stitching 201 ruptures in response to the tension T is tailored through the selection of materials and configuration of the tear stitching. The generally inverted V-shaped configuration of the tear stitching 201 illustrated in FIGS. 4A and 4B, which is oriented generally parallel to the tension T, focuses the tension T on the break point 210. Thus, it will be appreciated that the tension T is focused primarily on the few, e.g., 1 or 2, stitches that make up the break point 210 of the tear stitching 201.

Since the tension T is focused on the break point 210, the tear stitching 201 begins to rupture when the stitch thread 204 at the break point ruptures and begins to unravel from the material 220 and 230. The stitch thread 204, having a known tensile strength, will rupture when the tension T reaches a known value. Since the break point 210 comprises only a few stitches of the stitch thread 204, the number of variables that could affect the tension T at which the tear stitching begins to rupture is reduced as opposed to, for example, tear stitching in which the tension is spread over a large number of stitches. Therefore, predictable, reliable, and repeatable rupturing of the tear stitching 201 can be achieved by selecting a stitch thread 204 with an appropriate tensile strength based on known vehicle conditions and/or occupant conditions.

To help ensure the tear stitching 201 ruptures when tension T reaches a predetermined threshold level, the bobbin thread 202 may be selected to have a tensile strength greater than the stitch thread 204. This will help ensure that the stitch thread 204 ruptures first under the tension T and thus helps improve the predictability, reliability, and repeatability with which the entire tear stitching 201 ruptures. Consequently, the tear stitching 201 of the present invention helps to increase the reliability of the vent 80 actuating only when the first segment 118 of the tether 112 is fully tensioned upon rupture of the tear stitching 201 and release of the slackened portion 131.

Also, according to the present invention, the leg portions 212 of the tear stitching 201 may be designed to be just sufficient to maintain a predetermined strength for the connection between the overlying portions of material 220 and 230. By so designing the leg portions 212, the amount of tear stitching 201 that needs to unravel in order to release the portions 220 and 230 is minimized. This helps increase the speed at which the tear stitching 201 ruptures when the tension T reaches the desired magnitude, which can further promote the predictability, reliability, and repeatability with which the tear stitching 201 ruptures. Through testing and evaluation, it was determined that the performance of the tear stitching 201 can be affected through the stitch configuration, e.g., the shape of the tear stitching. To make this determination, various stitch configurations and thread types were tested to determine the load at which the tear stitching ruptured. The results of these tests are illustrated in the chart of FIG. 5.

Figure 5:
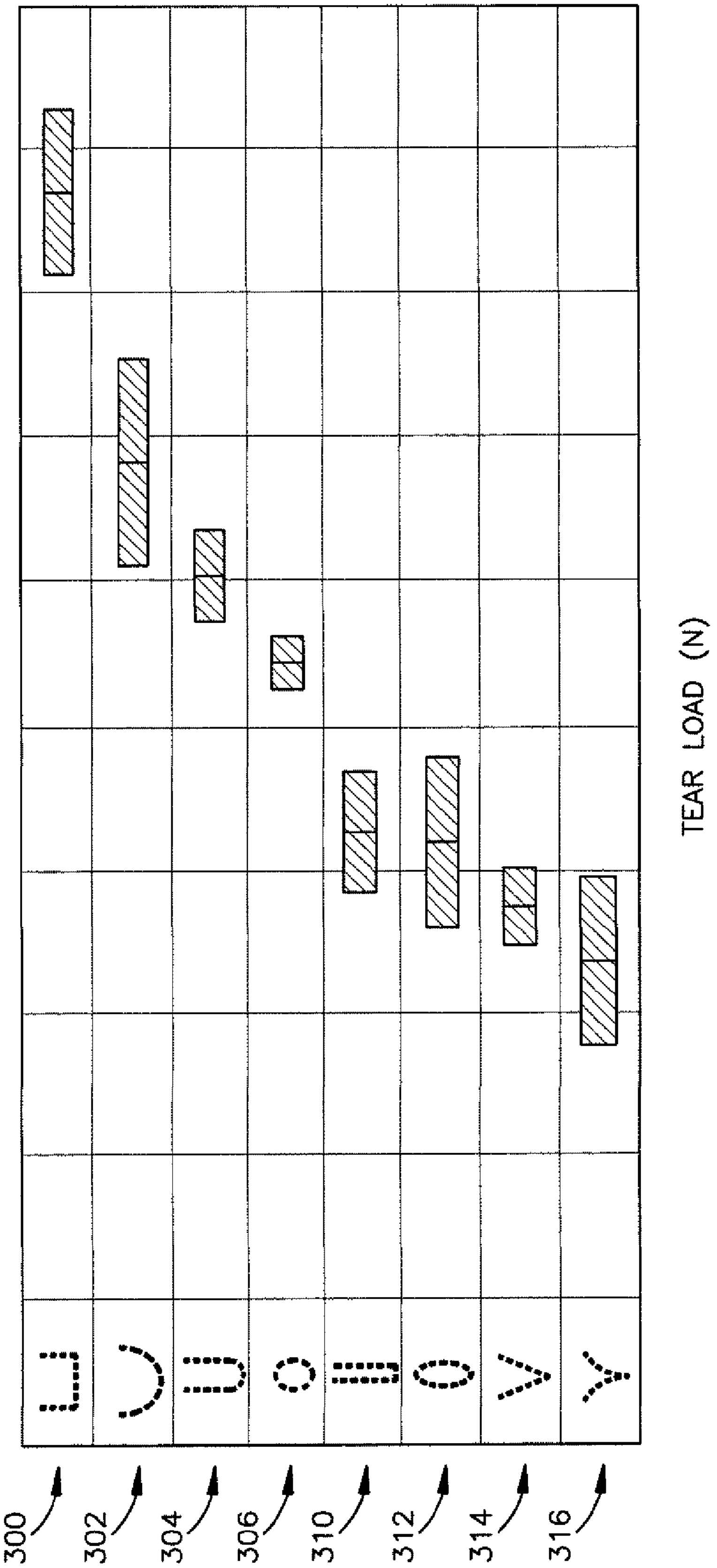
FIGS. 5 and 6 are graphically illustrate properties of the tear stitching of FIGS. 4A and 4B.

Referring to FIG. 5, various stitch shapes were tested to determine the load at which the tear stitching ruptured. In all of the tests, the tear stitching interconnected overlying portions of material in the same manner as that illustrated in FIGS. 4A and 4B. In each test, the tear stitching was oriented in a manner similar or identical to that shown in FIGS. 4A and 4B. In particular, the tear stitching was oriented such that the axis of symmetry of the tear stitching extended generally parallel to the opposite directions in which the tension is applied to the first and second portions of material, thus focusing the tension primarily on the break point for that particular stitch configuration.

As shown in FIG. 5, the generally curved V-shaped configuration shown and described in FIGS. 4A and 4B and along with seven other stitch configurations were tested. In each stitch configuration, the stitch thread was Tex-30 Nylon thread and the bobbin thread was Tex-138 Nylon with a stitch size of about 3 millimeters and a thread tension of about 120 cN (1.2 Newtons). The overlying portions of material were constructed of 700 dtex woven Nylon coated with silicone on one side.

The tests were conducted on eight different tear stitching configurations: square U-shaped tear stitching 300, semi-circular tear stitching 302, curved U-shaped tear stitching 304, O-shaped tear stitching 306, skinny square U-shaped tear stitching 310, oval-shaped tear stitching 312, straight V-shaped tear stitching 314, and curved V-shaped tear stitching 316. The curved V-shaped tear stitching 316 was identical to that illustrated in FIGS. 4A and 4B. Each of these tear stitching configurations incorporated ten stitches, except the skinny square U-shaped tear stitching 310, which incorporated 11 stitches. For each stitch configuration, the overlying portions of material were arranged as shown in FIGS. 4A and 4B and interconnected via the tear stitching. For the circular tear stitching 306 and the oval shaped tear stitching 312, the start and end points were located opposite the break point. Tension T was applied as shown in FIGS. 4A and 4B until the tear stitching ruptured, at which point the magnitude of the tension was recorded.

The testing was performed five to six times per stitch configuration. Based on the results of the tests, known statistical methods were employed to determine the expected performance for each stitch configuration with confidence intervals of 95%. The confidence levels for each stitch configuration are illustrated in the shaded areas associated with each stitch configuration in FIG. 5. By "95% confidence intervals," it is meant that, for each stitch configuration, the average rupture tension will fall within the range defined by the shaded areas 95% of the time. Thus, for example, for the curved V-shaped stitch configuration 316, the average rupture load will fall within the range of about 55-79 Newtons 95% of the time.

From the above, those skilled in the art will appreciate that, according to the present invention, the strength of the rupturable tear stitching 201 can be tailored through the configuration or shape of the tear stitching itself without altering the thread type and while maintaining a consistent, e.g., minimal, number of stitches. This allows the rupture strength of the tear stitching 201 to be tailored to performance criteria that may be application specific, even within the same overall application.

For example, referring to FIGS. 1-3B, it may be desirable that the rupture strength of the tear stitching 108 used to secure the vent door 106 be less than the rupture strength of the tear stitching 200 used to secure the slackened portion 131 of the tether 112. In this instance, the desired performance can be achieved, for example, by using the square U-shaped stitch configuration 300 (see FIG. 5) or semi-circular stitch configuration 302 for the tear stitching 200 so that the slackened portion 131 remains secured and the first segment 118 slackened due to relatively strong tear stitching. In a similar manner, straight V-shaped stitch configuration 314 or curved V-shaped stitch configuration 316 can be used for the tear stitching 108 so that the vent door 106 is maintained in the open condition by comparatively weaker tear stitching.

Through testing and evaluation, it was determined that the performance of the tear stitching 201 can also be affected by the type of thread used to construct the tear stitching. To make this determination, threads of various types were used to form three of the stitch configurations described above. These stitch configurations with the various threads were tested to determine the load at which the tear stitching ruptured. The results of these tests are illustrated in the chart of FIG. 6.

Figure 6:
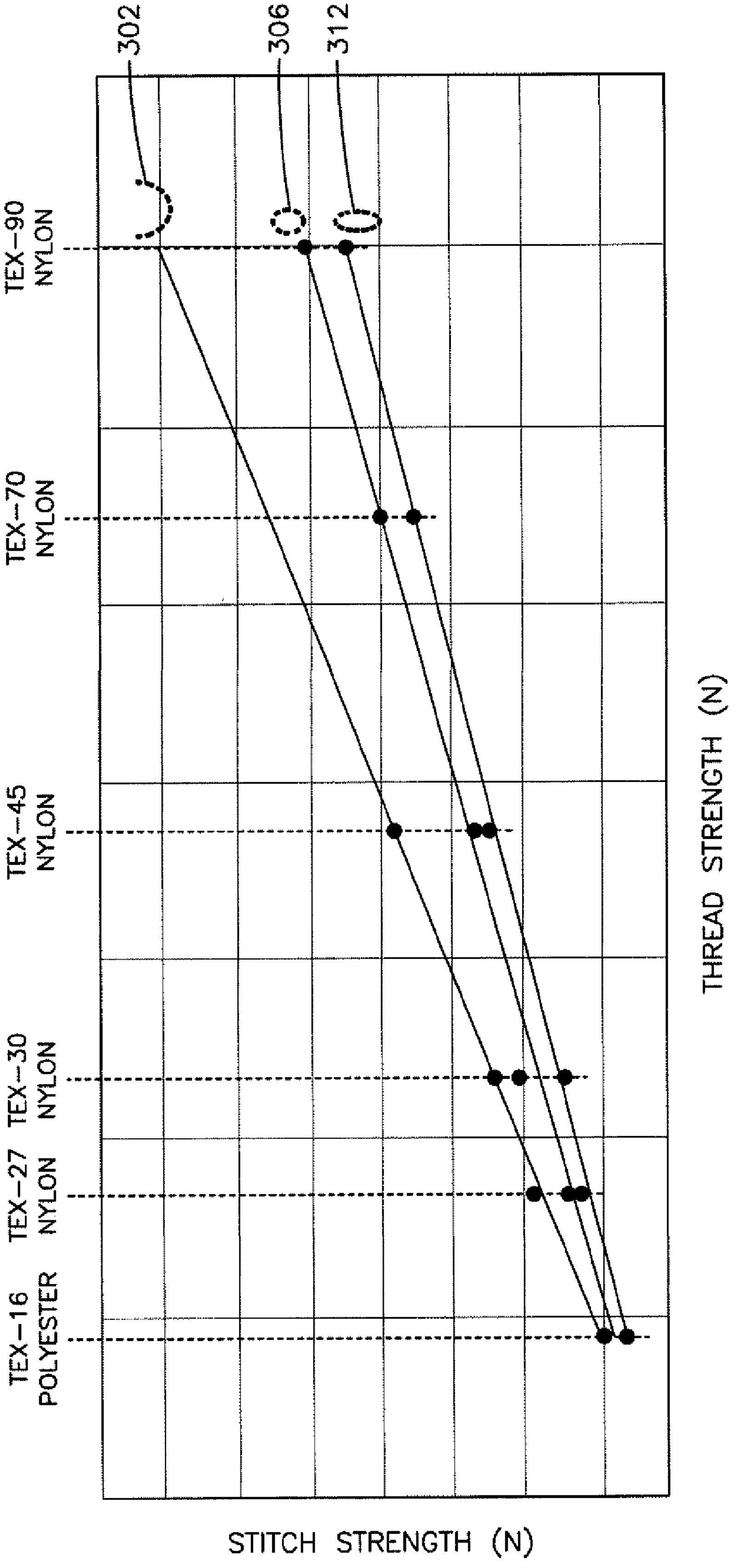

Referring to FIG. 6, the stitch configurations used to perform the tests were the semi-circular tear stitching 302, the circular tear stitching 306, and the oval-shaped tear stitching 312. In all of the tests, the tear stitching interconnected overlying portions of material in the same manner as that illustrated in FIGS. 4A and 4B. In each test, the tear stitching was oriented in a similar or identical manner as that shown in FIGS. 4A and 4B. For the circular tear stitching 306 and the oval shaped tear stitching 312, the start and end points were located opposite the break point. In particular, the tear stitching was oriented such that the axis of symmetry of the tear stitching extended generally parallel to the opposite directions in which the tension T was applied to the first and second portions of material, thus focusing the tension primarily on the break point. Each stitch configuration included ten stitches, the stitch size was about 3 millimeters, and the thread tension was about 120 cN (1.2 Newtons). The overlying portions of material were constructed of 700 dtex woven Nylon with a silicone coating applied on one side.

The tests were conducted on six different thread types for each stitch configuration: Tex-16 polyester thread, Tex-27 Nylon, Tex-30 Nylon, Tex-45 Nylon, Tex-70 Nylon, and Tex-90 Nylon. For each stitch configuration, the overlying portions of material were arranged as shown in FIGS. 4A and 4B and interconnected via the tear stitching. Tension T was applied, as shown in FIGS. 4A and 4B until the tear stitching ruptured, at which point the magnitude of the tension was recorded. For each of the six thread types, the test was repeated 5-6 times on each of the three stitch configurations.

The chart of FIG. 6 illustrates the results of the tests. In FIG. 6, the horizontal axis represents the tensile strength of the six different threads used in the tests. As illustrated in FIG. 6, the Tex-16 polyester thread has a tensile strength of about 1.8 Newtons, the Tex-27 nylon thread has a tensile strength of about 3.4 Newtons, the Tex-30 nylon thread has a tensile strength of about 4.7 Newtons, the Tex-45 nylon thread has a tensile strength of about 7.5 Newtons, the Tex-70 nylon thread has a tensile strength of about 11 Newtons, and the Tex-90 nylon thread has a tensile strength of about 14 Newtons. The vertical axis represents the stitch strength of the three stitch configurations using the different thread types.

In FIG. 6, the dots plotted on the chart represent average rupture strengths of the three stitch configurations using the different threads. For example, for the semi-circular stitch configuration 302 using the Tex-45 nylon thread, the average rupture strength was about 190 Newtons. As another example, for the circular stitch configuration 306 using the Tex-45 nylon thread, the average rupture strength was about 135 Newtons. As a further example, for the elliptical stitch configuration 312 using the Tex-45 nylon thread, the average rupture strength was about 125 Newtons. At this point, it should be noted that average stitch strengths for the semi-circular tear stitch configuration 302 using the Tex-70 and Tex-90 nylon threads were not recorded because the strength of the tear stitching exceeded 250 Newtons, which was the maximum tension that the device used to measure the tension was capable of measuring.

Based on the results presented in FIG. 6, it will be appreciated that as the thread strength increases, the strength of the tear stitching also increases. The lines plotted on the chart and associated with the stitch configurations approximate the relationship between thread strength and the strength of the tear stitching using a best-fit algorithm. These plotted lines illustrate that this relationship is approximately linear.

From the above, those skilled in the art will appreciate that, according to the present invention, the strength of the rupturable tear stitching 201 can be tailored through the selection of the thread used to construct the tear stitching without altering the configuration or shape of the tear stitching itself and while maintaining a consistent, e.g., small, number of stitches. This also allows the rupture strength to be tailored to performance criteria that may be application specific, even within the same overall application.

Combining the relationships illustrated in FIGS. 5 and 6, those skilled in the art will further appreciate that, according to the present invention, the strength of the rupturable tear stitching 201 can be tailored through a combination of selecting the type of thread used to construct the tear stitching and the configuration or shape of the tear stitching while maintaining a consistent, e.g., small, number of stitches. This also allows the rupture strength to be tailored to performance criteria that may be application specific, even within the same overall application.

For example, referring to FIGS. 1-3B, it may be desirable that the rupture strength of the tear stitching 108 used to secure the vent door 106 be less than the rupture strength of the tear stitching 200 used to secure the second segment 119 of the tether 112. In this instance, the desired performance can be achieved, for example, by using the Tex-70 or Tex-90 nylon thread with a square U-shaped stitch configuration 300 or semi-circular stitch configuration 302 to construct the tear stitching 200, and by using Tex-16 polyester or Tex-27 nylon thread with a V-shaped stitch configuration 314 or curved V-shaped stitch configuration 316 to construct the tear stitching 108.

Figure 7:
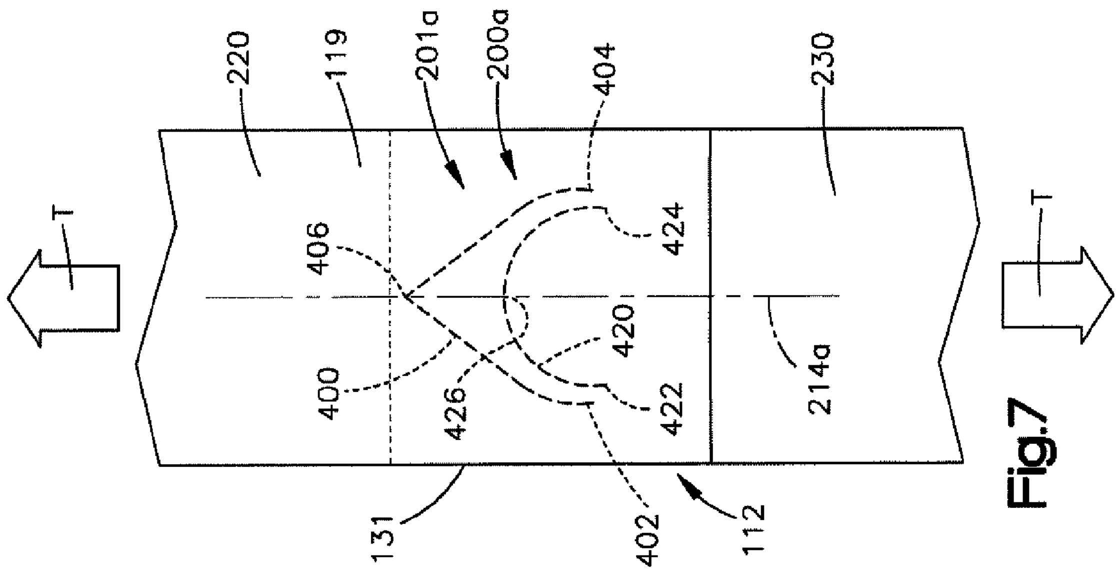
FIG. 7 is an enlarged schematic view illustrating tear stitching according to another aspect of the present invention.

FIG. 7 illustrates by way of example tear stitching 201*a* in accordance with another aspect of the present invention. Similar to the tear stitching 201 of FIGS. 4A and 4B, the tear stitching 201*a* may represent the tear stitching 108 and/or the tear stitching 200 of FIGS. 1-3B. As shown in FIG. 7, the tear stitching 201*a* includes two rupturable stitch lines: a first stitch line 400 and a second stitch line 420. The first and second stitch lines 400 and 420 may be constructed using conventional sewing techniques and equipment and include a bobbin thread and a stitch thread (not shown) as described above in regard to the embodiment of FIGS. 4A and 4B.

The first stitch line 400 has a start point 402, an end point 404, and a break point 406 located between, e.g., at the midpoint between, the start and end points. The break point 406 is the point along the first stitch line 400 where it is intended that the stitching begins to rupture under tension. Similarly, the second stitch line 420 has a start point 422, an end point 424, and a break point 426 located between, e.g., at the midpoint between, the start and end points. The break point 426 is the point along the second stitch line 420 where it is intended that the stitching begins to rupture under tension.

The first and second stitch lines 400 and 420 may have any of the shapes or configurations described above and illustrated in FIG. 5. The first and second stitch lines 400 and 402 may also have any of the material constructions described above and illustrated in FIG. 6. According to the present invention, the shape, configuration, and material construction of the first and second stitch lines 400 and 420 may be selected to tailor the stitching 201*a* to perform desired functions and to exhibit desired performance characteristics.

The first stitch line 400 has the inverted, generally curved V-shaped configuration described above and the second stitch line 420 has the semi-circular configuration described above. The tear stitching 201*a* is arranged such that an axis of symmetry 214*a* of the tear stitching extends generally parallel to the opposite directions in which tension, indicated generally by the arrows labeled T in FIG. 7, is applied to the first and second portions 220 and 230. These configurations, along with their material constructions, are selected to tailor the tear stitching 201*a* to perform desired functions and to exhibit desired performance characteristics.

The tear stitching 201*a* is configured to rupture in response to the tension T applied to the first and second portions of material 220 and 230. This tension T may correspond, for example, to the tension applied to the vent door 106 and side panel 104 during deployment of the air bag 14. This tension T may also correspond, for example, to the tension applied to the overlying portions of the second segment 119 of the tether 112.

As shown in FIG. 7, the first and second portions of material 220 and 230 are arranged such that the tension T applied to the portions results in a peeling action of motion between the portions, which acts on the tear stitching 201*a*. This peeling action is produced by folding back the second portion 230 such that it overlies the tear stitching 201*a*. The tension T, when applied, acts first on the break point 406 of the first stitch line 400 and then on the break point 426 of the second stitch line 420 after the first stitch line ruptures.

Since the tension T is focused initially on the break point 406, the first stitch line 400 begins to rupture when the stitch thread at the break point ruptures and begins to unravel from the material 220 and 230. The stitch thread, having a known tensile strength, will rupture when the tension T reaches a known value. Since the break point 406 comprises only a few stitches of the stitch thread, the number of variables that could affect the tension T at which the first stitch line 400 begins to rupture is reduced as opposed to, for example, tear stitching in which the tension is spread over a large number of stitches.

The function of the first stitch line 400 may, for example, be to help absorb or damp the forces exerted on the tear stitching 201*a* during initial deployment of the air bag 14. The first stitch line 400 may thus be configured to rupture in response to tension T forces less than those in response to which the second stitch line 420 is configured to rupture. The first stitch line 400 may rupture, either partially or completely, under forces T exerted on the tear stitching 201*a* during initial deployment of the air bag 14, leaving the second stitch line 420 intact so that it can respond in the desired manner to the aforementioned vehicle 12 and occupant 20 conditions in the vehicle. For example, the second stitch line 420 can remain intact during initial deployment only to subsequently rupture to release the slackened portion 131 and allow the first segment 118 to fully tension and actuate the vent 80. Alternatively, the second stitch line 420 can remain intact throughout inflation of the air bag 14 such that the vent 80 is un-actuated.

From the above, those skilled in the art will appreciate that a predictable, reliable, and repeatable rupture of the first and second stitch lines 400 and 420 can be achieved by selecting a stitch thread with an appropriate tensile strength and using it in an appropriate configuration. For example, through testing, the magnitude of the tension T exerted on the portions of material 220 and 230 due to deployment of the air bag 14 and the tension T exerted due to fully inflated conditions can be determined. The shape/configuration and material construction of the first stitch line 400 could be selected so that its rupture strength is at or about the magnitude of the measured deployment tensions. The shape/configuration and material construction of the second stitch line 420 could be selected so that its rupture strength is at or about the magnitude of the tensions measured during the fully inflated conditions.

Figure 8:
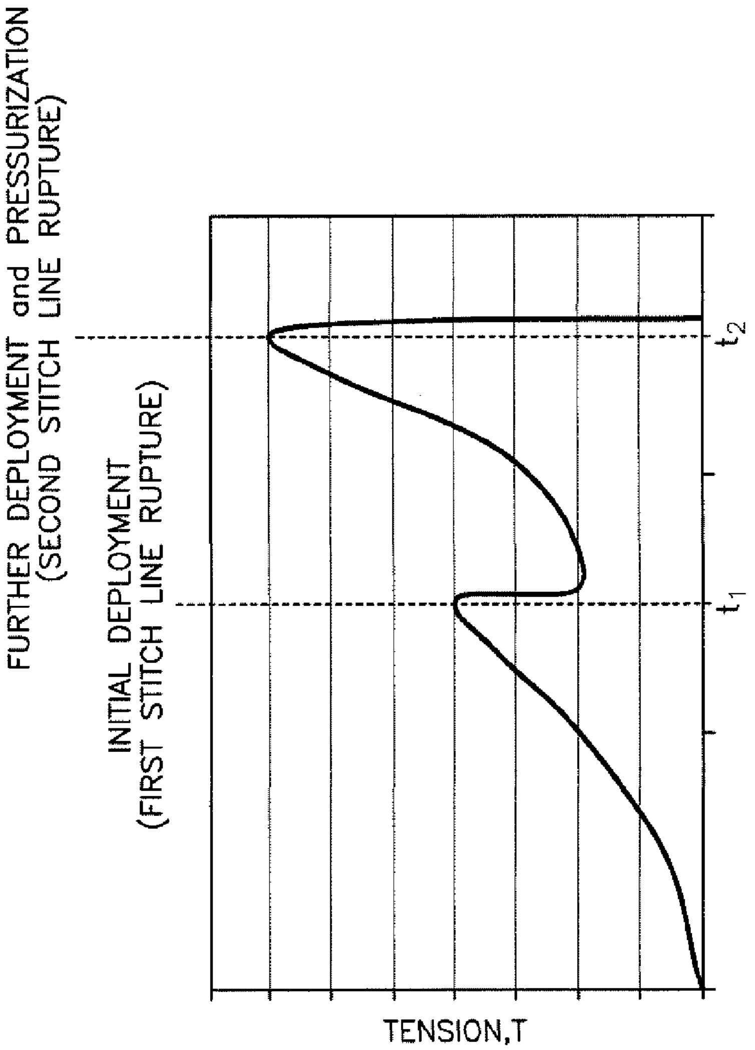
FIG. 8 is a chart illustrating properties of the tear stitching of FIG. 7.

FIG. 8 is a chart that illustrates the function of the tear stitching 201*a* of the embodiment of FIG. 7. As shown in FIG. 8, as the air bag 14 deploys, the tension T applied to the first and second portions of material 220 and 230 begins to increase. At time $t_1$, initial air bag 14 deployment increases the tension T on the portions of material 220, 230 to a magnitude at which the first stitch line 400 ruptures. This causes a brief decrease in the tension T due to the force absorbing/damping provided by the first stitch line 400. As the event prompting deployment of the air bag 14 continues, vehicle 12 and occupant 20 conditions, such as a normally seated and unbelted occupant, allow continued air bag deployment, which increases the tension T on the portions of material 220, 230 to the point at which the second stitch line 420 ruptures at time $t_2$. This completes rupture of the tear stitching 201*a* and releases the interconnection between the portions of material 220 and 230.

Those skilled in the art will appreciate that the embodiment of the invention illustrated in FIGS. 7 and 8 allows for a wide variety of configurations of the tear stitching 201*a*. For example, more than two stitch lines could be used to tailor further the performance characteristics of the tear stitching 201*a*. As another example, the first and second stitch lines 400 and 420 may constitute portions of a single stitch line instead of separate stitch lines.

Figure 9:
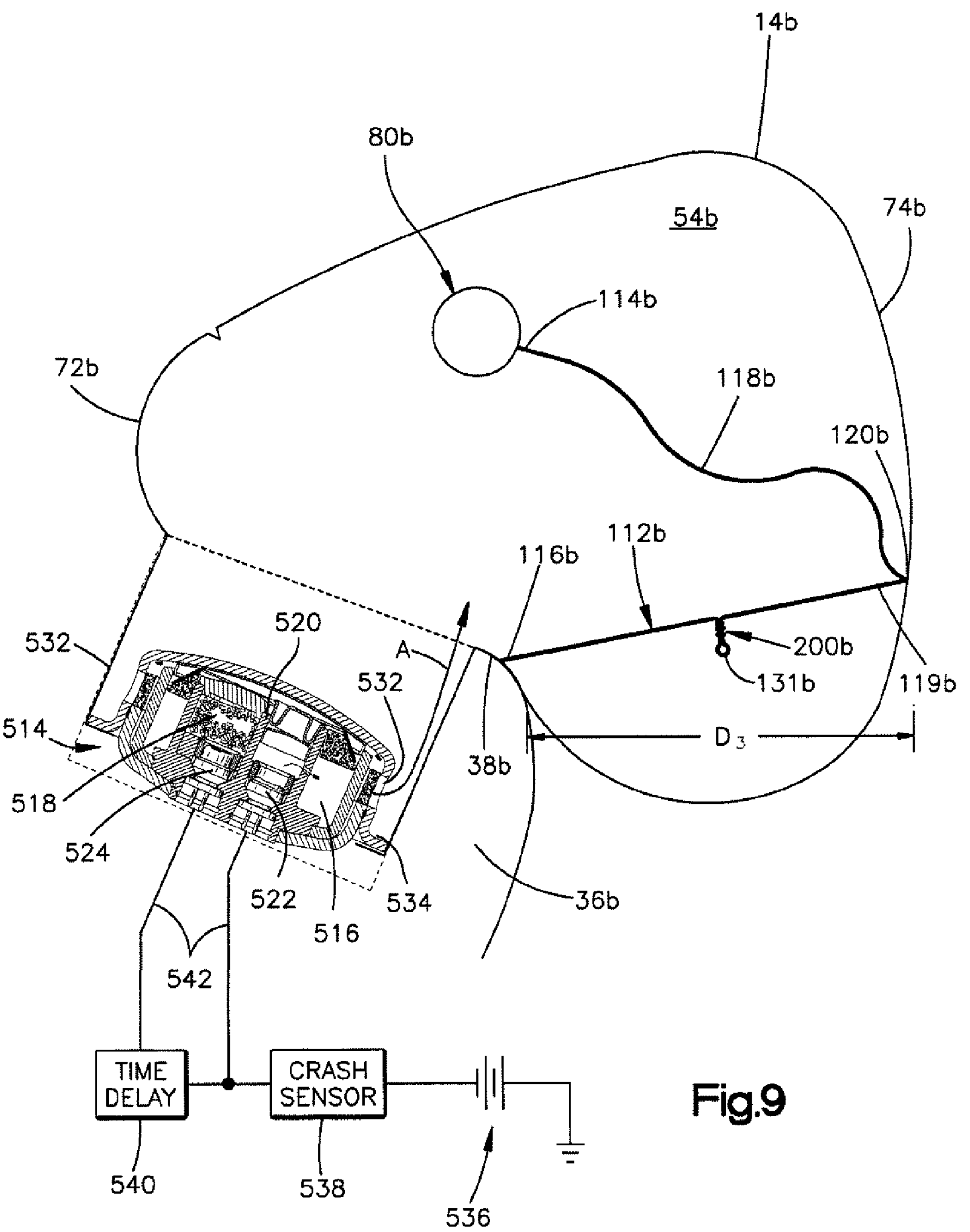
FIG. 9 is a schematic illustration of dual stage inflator in a first condition in accordance with another embodiment of the present invention.
Figure 10:
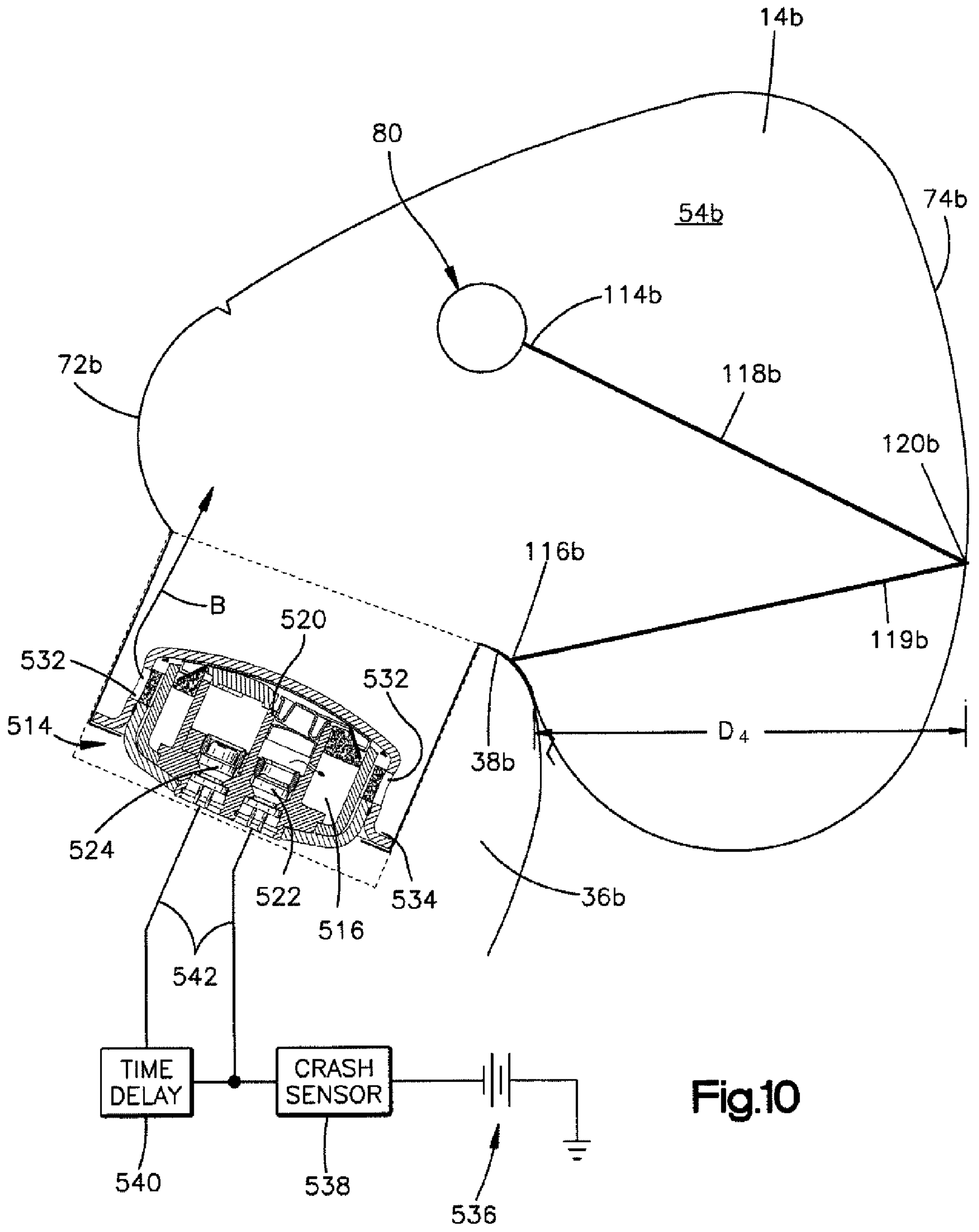
FIG. 10 is a schematic illustration of the dual stage inflator of FIG. 9 in a second condition.

FIGS. 9 and 10 illustrate an air bag in accordance with another embodiment of the present invention. Certain components in FIGS. 9 and 10 are similar or identical to components in FIGS. 1-3B. The suffix “b” is added to the reference numbers of these similar or identical components to FIGS. 1-3B to avoid confusion. In the embodiment of FIGS. 9 and 10, the inflator is a dual stage inflator. Referring to FIG. 9, an inflator 514 for inflating the air bag 14*b* is a schematically illustrated dual stage type inflator as disclosed in U.S. Patent Application Publication No. US-2002-014462, the entirety of which is incorporated herein by reference. The inflator 514 has first and second combustion chambers 516, 518 separated from each other by a wall 520. Each of the first and second combustion chambers 516, 518 contains a pyrotechnic material ignitable to generate inflation fluid in the form of gas for inflating the air bag 14*b*.

The inflator 514 includes first and second separately actuatable igniters 522, 524. The material in the first combustion chamber 516 is ignited by the first igniter 522. The material in the second combustion chamber 518 is ignited by the second igniter 524. The first and second combustion chambers 516, 518 could alternatively contain a stored quantity of pressurized inflation fluid and an ignitable material for heating the inflation fluid or a stored quantity of pressurized inflation fluid for inflating the air bag 14*b* (not shown).

The inflator 514 is electrically connected to vehicle electric circuitry 536 including a controller (not shown) and a sensor, illustrated schematically at 538, for sensing an event for which inflation of the air bag 14*b* is desired, such as a collision. Other sensors (not illustrated) may include an occupant position sensor that generates a control signal indicative of the position of the vehicle occupant, a buckle switch for generating a control signal indicative of a buckled or unbuckled condition of a seat buckle assembly of the vehicle or one or more of the following: a sensor that senses the presence of a rearward-facing child seat, a weight sensor, a belt tension sensor, an occupant size sensor, a module temperature sensor or a crash severity sensor.

If the vehicle condition(s) sensed by one or more of the sensors is at or above a first predetermined threshold level, it indicates the occurrence of a condition having a first predetermined threshold level of severity. The first threshold level of severity is a level at which inflation of the air bag 14*b* at a relatively low rate is desired for protection of a vehicle occupant. This relatively low inflation rate corresponds with activation of only the first igniter 522. If the vehicle condition(s) sensed by one or more of the sensors is at or above a second predetermined threshold level, it indicates the occurrence of a condition having a second, higher, predetermined threshold level of severity. The second threshold level of severity is a level at which inflation of the air bag 14*b* at a relatively high rate is desired for protection of a vehicle occupant. This relatively high rate corresponds with activation of both igniters 522, 524 simultaneously or in succession.

The condition sensed by the crash sensor 538 may be a sudden vehicle deceleration caused by a collision. The magnitude and duration of the deceleration are measured by the crash sensor 538. If the magnitude and duration of the deceleration meet or exceed predetermined threshold levels, they indicate the occurrence of a crash that meets or exceeds the predetermined threshold levels of crash severity. The condition sensed by the remaining sensors may include a position of the occupant in the interior of a vehicle that is in the contact path of the air bag 14*b*, a buckled or unbuckled condition of a seat buckle assembly of the vehicle, the presence of a rearward-facing child seat, a heavy or light-weight occupant, the seat belt tension, a large or small-size occupant, and the temperature of the module.

The vehicle electronic circuitry 536 also may include time delay circuitry 540 for delaying the time when the second igniter 524 is actuated after the first igniter 522 has been actuated. Depending on which of the combination of signals from the sensors is sent to the controller, the controller determines: 1) that no actuation signal is to be sent to the inflator 514 or 2) that an actuation signal is sent to the inflator to actuate both igniters 522, 524 at the same time or 3) to delay the time of activation of the second igniter 524 after the first igniter 522 has been actuated or 4) to actuate only igniter 522 without ever igniting igniter 524.

For example, in the case of signals received that indicate a forward positioned medium weight occupant and a medium impact collision occurring at medium speed, it may be desirable to delay the time of activation of the second igniter 524 after the first igniter 522 has been actuated. In a second example, in the case of signals received that indicate a rearward facing child seat and a vehicle collision, it may be desirable to not actuate the inflator 514. In a third example, in the case of signals received that indicate a large size occupant and a severe vehicle collision, it may be desirable to actuate both igniters 522, 524 at the same time. In a fourth example, in the case of signals received that indicated a light weight occupant and a low impact collision at slow speed, it may be desirable to actuate only igniter 522.

The dual stage inflator 514 is operatively connected to the sensor 538 via lead wires 542. Upon sensing the occurrence of an event for which inflation of the air bag 14*b* is desired, such as a vehicle collision, the sensor 538 provides a signal to the dual stage inflator 514 via the lead wires 542. In a first mode of operation of the dual stage inflator 514, upon receiving the signal from the sensor 538, the first igniter 522 is actuated and provides a first inflation fluid pressure in the air bag 14*b*. Arrow A in FIG. 9 schematically illustrates inflation fluid flowing through the inflation fluid outlets 532 from the first combustion chamber 516 into the inflatable volume 54*b* of the air bag 14*b*. The air bag 14*b* is in a partially inflated condition in FIG. 9 with a first fluid inflation pressure and an inflation depth $D_3$. The air bag 14*b*, while inflated, helps protect the vehicle occupant from impacts with the instrument panel 36*b* or the steering wheel (not shown). This is a first mode of operation of the dual stage inflator 514.

If both igniters 522, 524 are actuated at the same time or if the second igniter 524 is actuated (FIG. 10) after a predetermined time has passed according to the time delay circuit 540, the dual stage inflator 514 operates in a second mode of operation. In the second mode of operation, the material in the second combustion chamber 518 is ignited and flows though the inflation fluid outlets 532 into the inflatable volume 54*b* of the air bag 14*b*. Arrow B in FIG. 10 schematically illustrates inflation fluid flowing through the outlets 532 from the second chamber 518 into the inflatable volume 54*b* of the air bag 14*b*. The second inflation fluid pressure is therefore provided to the air bag 14*b* by the inflation fluid flowing from both the first and second combustion chambers 516, 518 (arrows A and B). The second inflation fluid pressure in the air bag 14*b* is higher than the first inflation fluid pressure. The inflation fluid provided by the first and second combustion chambers 516, 518 is sufficient to fully deploy the air bag 14*b* to the condition shown in FIG. 10 having an inflation depth $D_4$ greater than the inflation depth $D_3$.

The dual stage inflator 514 is configured to cooperate with the tether 112 for selectively actuating and/or throttling the vent 80. In particular, the first mode of operation of the inflator 514 provides a degree of air bag 14*b* inflation that tensions the second segment 119*b* of the tether 112*b* an amount below the predetermined magnitude necessary to rupture the tear stitching 200*b*. Accordingly, in the first mode of operation of the dual stage inflator 514, the slackened portion 131*b* is not released and, thus, first segment 118*b* of the tether 112*b* remains slackened. As a result, the vent 80*b* remains in the un-actuated condition.

On the other hand, the second mode of operation of the inflator 514 provides a degree of air bag 14*b* inflation that tensions the second segment 119*b* of the tether 112*b* at or above the predetermined magnitude necessary to rupture the tear stitching 200*b*. Accordingly, in the second mode of operation of the dual stage inflator 514, the first segment 118*b* of the tether 112*b* is tensioned sufficient to rupture the tear stitching 200*b* and release the slackened portion 131*b*. As a result, the first segment 118*b* is fully tensioned with the fully deploying air bag 14*b* and the vent 80*b* placed in the actuated condition. The air bag 14*b* of FIGS. 9 and 10 thereby operates similarly to the air bag 14 of FIGS. 1-3B.

From the above description of the invention, those skilled in the art will perceive improvements, changes and modifications. Such improvements, changes and modifications within the skill of the art are intended to be covered by the appended claims. For example, it will be appreciated that one or more of the components of each embodiment may be readily incorporated into each of the other embodiments within the spirit of the invention.

Having described the invention, the following is claimed:

1. An apparatus for helping to protect an occupant of a vehicle, the apparatus comprising:

an inflatable vehicle occupant protection device inflatable between a vehicle surface and the vehicle occupant, the protection device comprising a front panel having a portion presented toward the occupant when the protection device is in an inflated condition;

a vent having at least one opening for releasing inflation fluid from the protection device and having an actuated condition and a non-actuated condition;

a tether having a first segment connected to the vent and the front panel of the protection device for actuating the vent and a second segment connected to the front panel and a rear portion of the protection device; and tear stitching connecting portions of the second segment of the tether and forming a slackened portion of the tether by extending through the second segment at a location where the second segment is doubled over onto itself, the tear stitching remaining intact such that the first segment is slackened and the vent is maintained in the non-actuated condition in response to initial deployment of the protection device below a predetermined degree, further deployment of the protection device to the predetermined degree causing the tear stitching to rupture and release the slackened portion which allows the first segment of the tether to tension and act on the vent to place the vent in the actuated condition.

2. The apparatus recited in claim 1, wherein the tear stitching comprises a break point and first and second stitch segments extending away from the break point, the tear stitching being arranged on the second segment of the tether such that tension forces acting to rupture the tear stitching act primarily on the break point so that the tear stitching ruptures first at the break point and then along the first and second stitch segments.

3. The apparatus recited in claim 2, wherein the tear stitching comprises a stitch thread and a bobbin thread, the bobbin thread having a tensile strength higher than a tensile strength of the stitch thread.

4. The apparatus recited in claim 2, wherein the shape of the tear stitching affects the strength of the break point.

5. The apparatus recited in claim 2, wherein the tear stitching has an axis extending through the break point and bisecting the tear stitching, the tear stitching being arranged such that the axis extends substantially parallel to the tension forces acting to rupture the tear stitching.

6. The apparatus recited in claim 2, wherein the break point of the tear stitching comprises two or fewer stitches.

7. The apparatus recited in claim 1, wherein the tear stitching interconnects portions of the second segment of the tether that when interconnected maintain the protection device in a first inflated condition with a first inflated volume, the tear stitching being rupturable to release the interconnected portions which allows the protection device to inflate to a second inflated condition with a second inflated volume, the second inflated volume being greater than the first inflated volume.

8. The apparatus recited in claim 1, wherein the tear stitching interconnects overlying first and second portions of the second segment of the tether, the tear stitching being rupturable upon the protection device deploying to the predetermined degree to permit the interconnected portions to move relative to each other, the tear stitching comprising a break point and first and second stitch segments extending away from the break point, a non-stitched portion of the second portion that is free from stitching being folded back to overlie a stitched portion of the second portion, the folded back portion forming a fold positioned adjacent the break point, the first and second portions being configured such that tension on the second fabric portion creates a peeling action whereby the folded back portion being free from stitching is free to move relative to and be pulled along the stitched portion so that the fold moves toward the break point in order to focus tension forces acting to rupture the tear stitching on the fold and primarily on the break point so that the tear stitching ruptures first at the break point and then along the first and second stitch segments.

9. The apparatus recited in claim 1, wherein the tear stitching comprises first and second stitch lines positioned next to each other, the first stitch line being adapted to rupture in response to initial deployment of the protection device before the predetermined degree, the second stitch line being adapted to maintain the protection device at the initial stage of deployment prior to the protection device reaching the predetermined degree of deployment.

10. The apparatus recited in claim 9, wherein the second stitch line is adapted to rupture in response to unrestricted deployment and pressurization of the protection device.

11. The apparatus recited in claim 9, wherein each of the first and second stitch lines comprises a break point and first and second stitch segments extending away from the break point, the first stitch line having a configuration that is different than the second stitch line so that the rupture strength of the first stitch line is less than the rupture strength of the second stitch line.

12. The apparatus recited in claim 9, wherein the first line has a V-shaped configuration and the second stitch line has an arcuate configuration.

13. The apparatus recited in claim 9, wherein the first line has a first arcuate configuration and the second stitch line has a second arcuate configuration.

14. The apparatus recited in claim 9, wherein the first and second stitch lines comprise portions of a single line of stitching.

15. The apparatus recited in claim 1, wherein the actuated condition of the vent is a closed condition blocking inflation fluid from venting from the protection device and the non-actuated condition of the vent is an open condition venting inflation fluid from the protection device.

16. The apparatus recited in claim 15, wherein the vent is configured to be placed in the closed condition in response to rupturing of the tear stitching to allow the protection device to reach a fully deployed condition.

17. The apparatus recited in claim 1, wherein the second segment of the tether is configured to prevent actuation of the vent by the first segment of the tether in response to the protection device being inhibited from deployment.

18. The apparatus recited in claim 1 further comprising an inflation fluid source having first and second modes of operation, the inflation fluid source being activated in the first mode of operation to increase an inflation fluid pressure in the protection device to a first inflation fluid pressure corresponding with deployment below the predetermined degree, the inflation fluid source being activated in the second mode of operation to increase the inflation fluid pressure in the protection device to a second inflation fluid pressure higher than the first inflation fluid pressure and corresponding with deployment to or above the predetermined degree, and the tear stitching remaining intact and the vent being in the non-actuated condition in response to the first inflation fluid pressure in the protection device, the tear stitching rupturing to allow the first segment of the tether to actuate the vent in response to the inflation fluid pressure in the protection device reaching the second inflation fluid pressure.

19. The apparatus recited in claim 1, wherein the tear stitching forms a loop in the second segment defining the slackened portion of the tether.

20. The apparatus recited in claim 1, wherein the first and second segments are integrally formed together as a single piece of material.

21. An apparatus for helping to protect an occupant of a vehicle, the apparatus comprising:

an inflatable vehicle occupant protection device inflatable between a vehicle surface and the vehicle occupant, the protection device comprising a front panel having a portion presented toward the occupant when the protection device is in an inflated condition;

a vent having at least one opening for releasing inflation fluid from the protection device and having an actuated condition and a non-actuated condition;

a tether connected to the vent and the protection device for actuating the vent; and tear stitching extending through folded over portions of the tether to form a slackened portion of the tether, the tear stitching remaining intact to prevent the tether from fully tensioning such that the vent is in the non-actuated condition in response to initial deployment of the protection device below a predetermined degree, further deployment of the protection device to the predetermined degree causing the tear stitching to rupture and release the slackened portion which allows the tether to act on the vent and place the vent in the actuated condition.

22. An apparatus for helping to protect an occupant of a vehicle, the apparatus comprising:

an inflatable vehicle occupant protection comprising a front panel having a portion presented toward the occupant when the protection device is in an inflated condition;

a vent having at least one opening for releasing inflation fluid from the protection device, the vent having an actuated condition and a non-actuated condition;

a first tether segment that connects the vent to the front panel;

a second tether segment that connects the front panel to a rear portion of the protection device; and tear stitching that interconnects overlying portions of the second tether segment and shortens the effective length of the second tether segment, wherein the shortened second tether segment inhibits movement of the front panel away from the rear portion during deployment, which inhibits the front panel from tensioning the first tether segment to actuate the vent, and wherein the tear stitching when ruptured lengthens the second tether segment, which permits the front panel to move away from the rear portion and thereby allows the front panel to tension the first tether segment to actuate the vent.

23. The apparatus recited in claim 22, wherein the first tether segment and the second tether segment are portions of a single length of tether material.

24. The apparatus recited in claim 22, wherein the front panel being inhibited from movement maintains slack in the first tether segment.

25. The apparatus recited in claim 22, wherein the tear stitching is adapted to rupture in response to the protection device reaching a predetermined degree of deployment.

26. The apparatus recited in claim 22, wherein the tear stitching is adapted to maintain the interconnection of the overlying portions of the second tether segment in response to obstructed deployment of the front panel.

27. The apparatus recited in claim 22, further comprising a two-stage inflator, wherein the tear stitching is adapted to maintain the interconnection of the overlying portions of the second tether segment in response to actuation of a primary stage of the inflator, and wherein the tear stitching is adapted to rupture in response to actuation of the primary stage and a secondary stage of the inflator.

* * * * *